(12) United States Patent
Petkov et al.

(10) Patent No.: US 11,445,133 B2
(45) Date of Patent: Sep. 13, 2022

(54) LOW POWER AND LOW DATA-RATE IMAGER

(71) Applicant: Robert Bosch GmbH, Stuttgart (DE)

(72) Inventors: Vladimir Petkov, San Jose, CA (US); Pedram Lajevardi, Menlo Park, CA (US); Christoph Lang, Sunnyvale, CA (US); Nikhil Naikal, Washington, DC (US); Sam Kavusi, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 331 days.

(21) Appl. No.: 16/632,103

(22) PCT Filed: Aug. 9, 2018

(86) PCT No.: PCT/US2018/045948
§ 371 (c)(1),
(2) Date: Jan. 17, 2020

(87) PCT Pub. No.: WO2019/032792
PCT Pub. Date: Feb. 14, 2019

(65) Prior Publication Data
US 2020/0169669 A1 May 28, 2020

Related U.S. Application Data

(60) Provisional application No. 62/547,297, filed on Aug. 18, 2017, provisional application No. 62/543,646, filed on Aug. 10, 2017.

(51) Int. Cl.
*H04N 5/343* (2011.01)
*H04N 5/378* (2011.01)
(Continued)

(52) U.S. Cl.
CPC .......... *H04N 5/343* (2013.01); *H04N 5/3456* (2013.01); *H04N 5/351* (2013.01); *H04N 5/378* (2013.01)

(58) Field of Classification Search
CPC ...... H04N 5/343; H04N 5/345; H04N 5/3456; H04N 5/351; H04N 5/378
See application file for complete search history.

(56) References Cited

U.S. PATENT DOCUMENTS

| 6,204,879 B1 * | 3/2001 | Koseki | H04N 7/15 348/E7.083 |
| 6,839,452 B1 * | 1/2005 | Yang | H03F 3/082 348/E3.02 |

(Continued)

FOREIGN PATENT DOCUMENTS

KR 10-1621048 B1 5/2016

OTHER PUBLICATIONS

International Search Report corresponding to PCT Application No. PCT/US2018/045948, dated Nov. 27, 2018 (3 pages).

*Primary Examiner* — Daniel M Pasiewicz
(74) *Attorney, Agent, or Firm* — Maginot, Moore & Beck LLP

(57) ABSTRACT

An imaging system for low-power and low data-rate applications is provided. The imaging system comprises a pixel array having a plurality of photosensitive elements (pixels) divided into a plurality of groups of photosensitive elements (super pixels). An image processor is operably connected to the pixel array and configured to selectively operate each group of photosensitive elements in either (i) a high resolution mode in which the pixel array outputs readout voltages corresponding to all of the photosensitive elements in the respective group of photosensitive elements or (ii) a low resolution mode in which the pixel array outputs readout voltages corresponding to only a subset of the photosensitive (Continued)

elements in the respective group of photosensitive elements. Groups of photosensitive elements corresponding to detected motion in each image frame are operated in the high resolution mode, while the remaining groups of photosensitive elements are operated in the low resolution mode.

15 Claims, 4 Drawing Sheets

(51) Int. Cl.
    *H04N 5/345*     (2011.01)
    *H04N 5/351*     (2011.01)

(56) References Cited

U.S. PATENT DOCUMENTS

| | | | |
|---|---|---|---|
| 2004/0141067 A1* | 7/2004 | Nakayama | H04N 5/3456 348/222.1 |
| 2007/0250898 A1* | 10/2007 | Scanlon | G06K 9/00536 375/E7.076 |
| 2009/0115877 A1 | 5/2009 | Verdant | |
| 2009/0225189 A1* | 9/2009 | Morin | H04N 5/3454 348/222.1 |
| 2015/0049231 A1 | 2/2015 | Chen et al. | |
| 2015/0201138 A1 | 7/2015 | Hiwada et al. | |
| 2017/0208279 A1 | 7/2017 | Raynor | |

\* cited by examiner

LOW POWER AND LOW DATA-RATE IMAGER

This application is a 35 U.S.C. § 371 National Stage Application of PCT/US2018/045948, filed on Aug. 9, 2018, which claims the benefit of priority of U.S. provisional application Ser. No. 62/543,646, filed on Aug. 10, 2017, and of U.S. provisional application Ser. No. 62/547,297, filed on Aug. 18, 2017, the disclosures of which are herein incorporated by reference in their entirety.

FIELD

The device and method disclosed in this document relates to an imaging system and, more particularly, to an imaging system which achieves low power and low data rate without losing important information.

BACKGROUND

Unless otherwise indicated herein, the materials described in this section are not prior art to the claims in this application and are not admitted to the prior art by inclusion in this section.

Many image processing algorithms rely on background subtraction to identify moving objects. In such algorithms, a background model is first generated, which is then used to identify objects. Since the background model changes due to the change of objects such as change in lighting condition, movement of objects such as chairs and so forth, the background model has to be constantly updated. Many image processing algorithms operate on small blocks of the pixel array as opposed to on every single pixel. That is, instead of labeling each pixel as an object or background, some algorithms focus on a small region to identify if there is an object in that region. Such small regions are called "super pixels" and the design of the image sensor pixel array is also based on such super pixels. Generally imagers with on-chip or in-pixel processing of data exist in the market today. However, none of these imagers having on-chip or in-pixel processing enable reading out only relevant data from the pixel array in an attempt to reduce the data rate and also the power consumption.

SUMMARY

An imaging system is disclosed. The imaging system comprises a pixel array having a plurality of photosensitive elements arranged in a grid formation and being divided into a plurality of groups of photosensitive elements, the photosensitive elements in each group of photosensitive elements being adjacent to one another in the grid formation, the pixel array being configured to output readout voltages proportional to light intensities at individual photosensitive elements in the plurality of photosensitive elements; an analog-to-digital converter operably connected to the pixel array to receive the readout voltages and convert the readout voltages into digitized light intensity values; and at least one processor operably connected to the pixel array and the analog-to-digital converter, the at least one processor being configured to selectively operate each group of photosensitive elements in the plurality of groups of photosensitive elements in one of (i) a high resolution mode in which the pixel array outputs readout voltages corresponding to all of the photosensitive elements in the respective group of photosensitive elements and (ii) a low resolution mode in which the pixel array outputs readout voltages corresponding to only a subset of the photosensitive elements in the respective group of photosensitive elements, wherein group of photosensitive elements in the plurality of groups of photosensitive elements is operable by the at least one processor in both the high resolution mode and the low resolution mode at different times.

In one embodiment, the at least one processor is configured to: receive an image frame, from the analog-to-digital converter, comprising digitized light intensity values corresponding to at least some of the photosensitive elements in each group of photosensitive elements in the plurality of groups of photosensitive elements; and selectively operate each group of photosensitive elements in the plurality of groups of photosensitive elements in the high resolution mode and the low resolution mode at different times depending on the digitized light intensity values of the image frame.

In one embodiment, the at least one processor is configured to: operate a first group of photosensitive elements in the plurality of groups of photosensitive elements in the low resolution mode depending on to the digitized light intensity values in the image frame corresponding to the photosensitive elements in the first group of photosensitive elements; and operate a second group of photosensitive elements in the plurality of groups of photosensitive elements in the high resolution mode depending on to the digitized light intensity values in the image frame corresponding to the photosensitive elements in the second group of photosensitive elements.

In one embodiment, the at least one processor is configured to, for each group of photosensitive elements in the plurality of groups of photosensitive elements: detect whether any moving objects are present in a respective portion of the image frame corresponding to the respective group of photosensitive elements based on the digitized light intensity values in the image frame corresponding to the photosensitive elements in the respective group of photosensitive elements; operate the respective group of photosensitive elements in the low resolution mode in response to no moving object being detected in the respective portion of the image frame corresponding to the respective group of photosensitive elements; and operate the respective group of photosensitive elements in the high resolution mode in response to a moving object being detected in the respective portion of the image frame corresponding to the respective group of photosensitive elements.

In one embodiment, the at least one processor is configured to, for each group of photosensitive elements in the plurality of groups of photosensitive elements, compare the respective portion of the image frame corresponding to the respective group of photosensitive elements with a corresponding portion of a reference background image frame to detect whether any moving objects are present in the respective portion of the image frame.

In one embodiment, the at least one processor is configured to generate an intermediate image frame comprising light intensity difference values by subtracting the reference background image frame from the received image frame.

In one embodiment, the at least one processor is configured to, for each group of photosensitive elements in the plurality of groups of photosensitive elements: operate the respective group of photosensitive elements in the low resolution mode in response to the absolute value of each light intensity difference value of a respective portion of the intermediate image frame that corresponds to the respective group of photosensitive elements being less than a predetermined threshold difference value; and operate the respective group of photosensitive elements in the high resolution mode in response to the absolute value of any light intensity difference value of a respective portion of the intermediate image frame that corresponds to the respective group of photosensitive elements being greater than a predetermined threshold difference value In one embodiment, the at least one processor is configured to: detect a change of lighting conditions in the image frame based on the digitized light intensity values of the image frame; and operate the pixel array with an adjusted exposure time that depends on the change in the lighting conditions.

In one embodiment, the at least one processor is configured to identify at least one portion of the reference background image frame to be updated based on the intermediate image frame, the at least one portion corresponding to at least one group of photosensitive elements in the plurality of groups of photosensitive elements; and update the at least one portion of the reference background image frame based on at least one corresponding portion of the image frame.

In one embodiment, each group of photosensitive elements in the plurality of groups of photosensitive elements comprises a common number of photosensitive elements arranged in a common formation within the grid formation and, for each group of photosensitive elements in the plurality of groups of photosensitive elements that is operated in the low resolution mode, the subset of the photosensitive elements for which the pixel array outputs readout voltages corresponds to a defined pattern of photosensitive elements within the common formation.

In one embodiment, the defined pattern of photosensitive elements within the common formation is adjustable by the at least one processor.

In one embodiment, the at least one processor is configured to: for each group of photosensitive elements in the plurality of groups of photosensitive elements that is operated in the low resolution mode, control the analog-to-digital converter to convert the readout voltages corresponding to the respective the subset of the photosensitive elements in the respective group of photosensitive elements with a first bit depth that is less than a maximum bit depth of the analog-to-digital converter; and for each group of photosensitive elements in the plurality of groups of photosensitive elements that is operated in the high resolution mode, control the analog-to-digital converter to convert the readout voltages corresponding to all of the photosensitive elements in the respective group of photosensitive elements with the maximum bit depth of the analog-to-digital converter.

In one embodiment, the first bit depth is adjustable by the at least one processor.

In one embodiment, the at least one processor is configured to: for each group of photosensitive elements in the plurality of groups of photosensitive elements that is operated in the low resolution mode, control the pixel array and the analog-to-digital converter to update and convert the readout voltages corresponding to the subset of the photosensitive elements in the respective group of photosensitive elements with a first update rate that is less than a maximum update rate; and for each group of photosensitive elements in the plurality of groups of photosensitive elements that is operated in the high resolution mode, control the pixel array and the analog-to-digital converter to update and convert the readout voltages corresponding to all of the photosensitive elements in the respective group of photosensitive elements with the maximum update rate.

In one embodiment, the first update rate is adjustable by the at least one processor.

BRIEF DESCRIPTION OF THE DRAWINGS

The foregoing aspects and other features of the imaging system are explained in the following description, taken in connection with the accompanying drawings.

DETAILED DESCRIPTION

Figure 1:
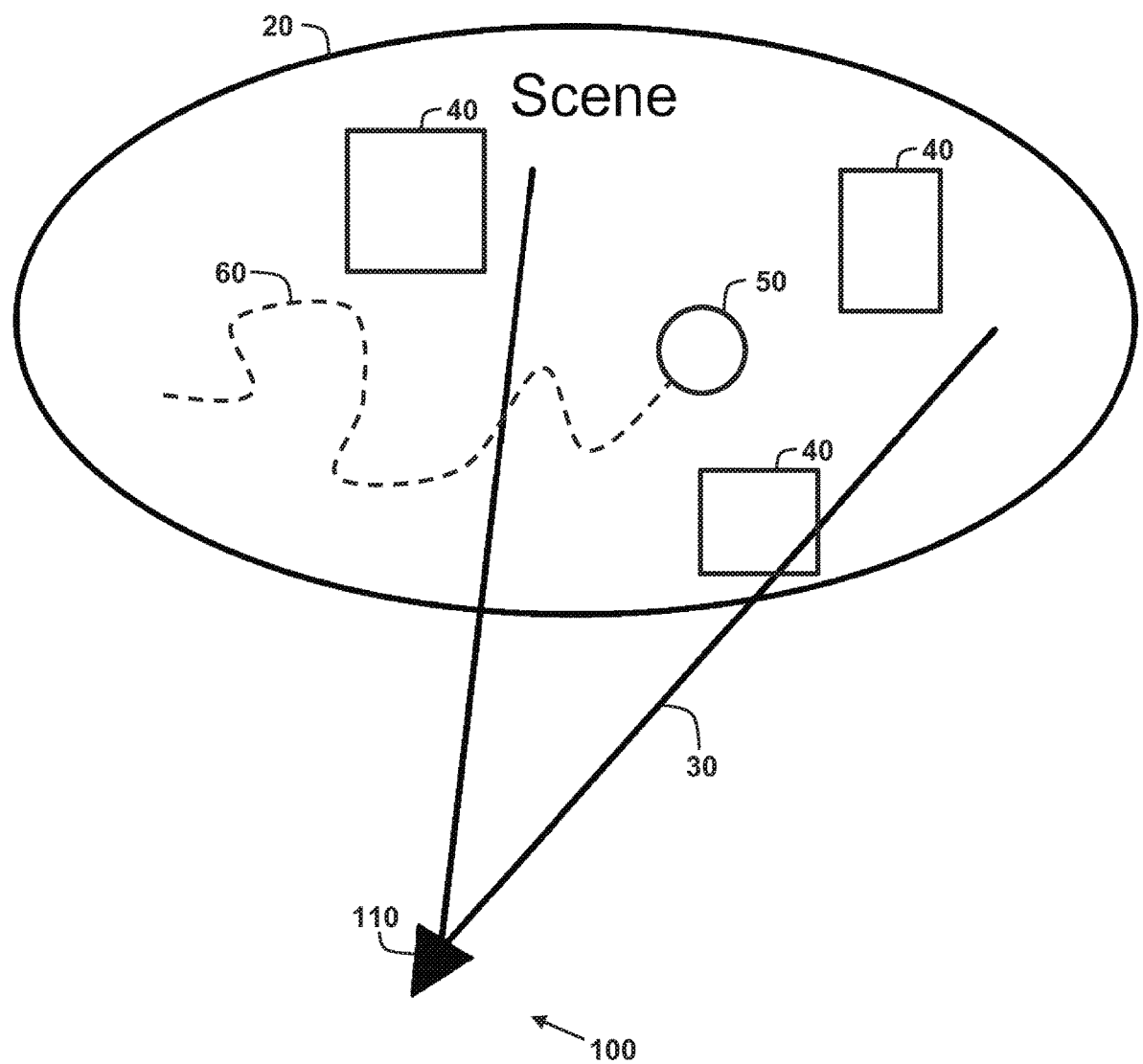
FIG. 1 shows an exemplary embodiment of an imaging system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
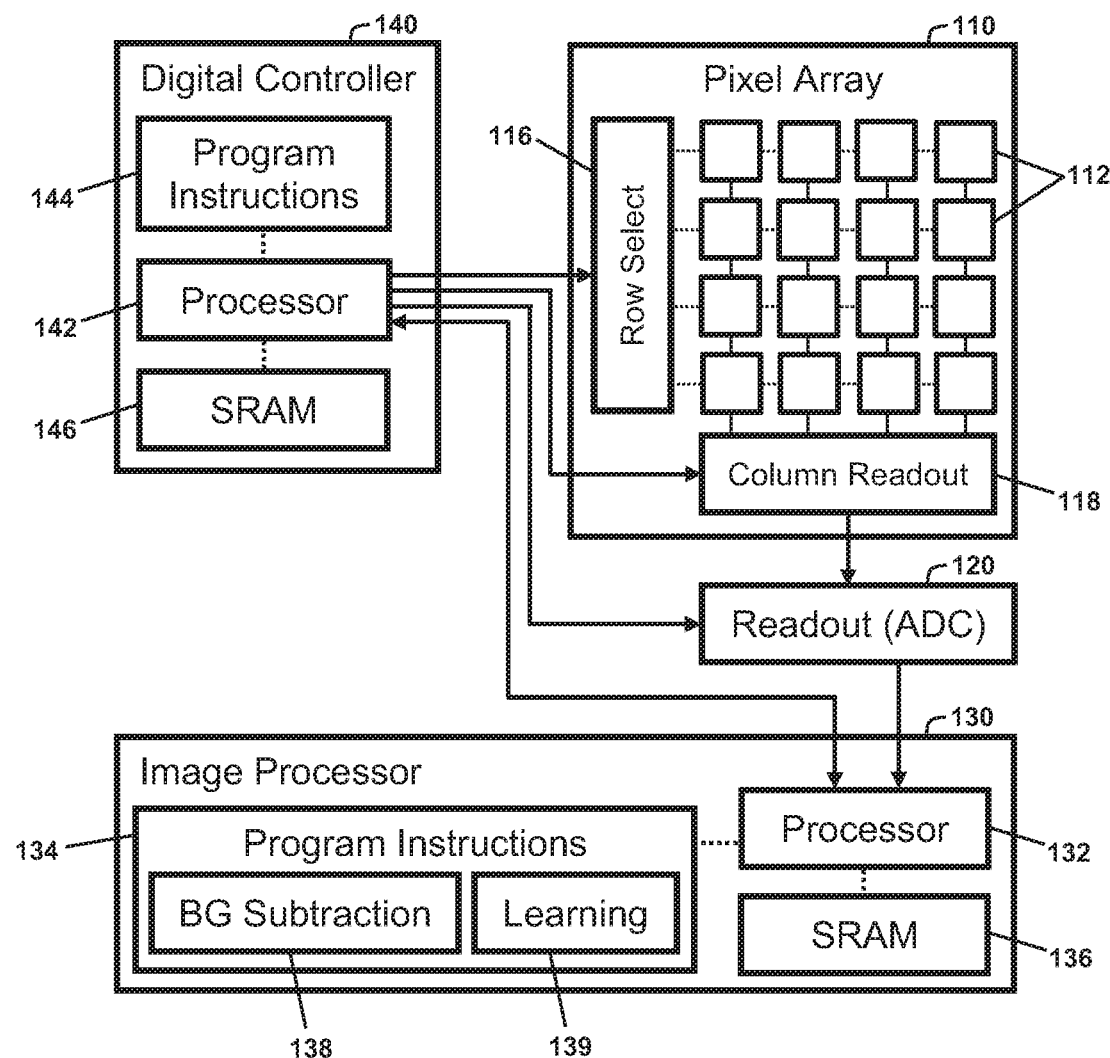
FIG. 2 shows exemplary components of the imaging system of FIG. 1.

With reference to FIGS. 1-2, exemplary embodiments of an imaging system 10 are shown. As shown in FIG. 1, the imaging system 100 at least includes a pixel array 110 (which may also be referred to herein as a "sensor array"). The pixel array 110 is configured to capture a plurality of image frames of a scene 20 over time. It will be appreciated that, at a given position and orientation of the pixel array 120, the pixel array 110 has a restricted field of view 30 such that an image captured by the pixel array 110 includes only a portion of the scene 20. The scene 20 comprises a real-world environment and, as such, may contain a variety of objects or structures therein. Generally, the scene 20 includes objects or structures 40 (e.g., buildings, trees, walls, furniture, etc.) that are static or mostly static, which make up the background environment of the scene 20. In contrast, the scene may also include moving objects 50 (e.g., people, animals, cars, etc.), which may move into or out of the field of view 30 of the pixel array 110 over time. For example, a moving object 50 may move along a path 60 through the scene 20. As illustrated, the moving object 50 has moved into the field of view 30 of the pixel array 110. It will be appreciated, however, that the distinction between the static objects 40 and the moving objects 50 is dynamic and merely for illustrative purposes. In some cases, the moving object 50 may move stay in motion while it is in the field of view 30. In other cases, the moving object 50 may stop moving for some time and become static (such as a person who moves into the field of view 30 and sits down). Similarly, a static background object 40 may move from one place to another (such as a chair which is moved from one location to another). As discussed in greater detail below, the imaging system 100 is advantageously designed to operate the pixel array 110 with adjustable resolution, frame rate, and/or bit-depth depending whether there is motion (e.g., the moving object 50) within different portions of the field of view 30 of the pixel array 110 in such a way as to minimize a power consumption of the imaging system 100, while not losing any important visual information.

FIG. 2 shows exemplary components of one embodiment of the imaging system 100. Particularly, in addition to the pixel array 110, the imaging system 100 further includes a readout circuit 120, an image processor 130, and a digital controller 140. As discussed in greater detail below, the readout circuit 120 digitizes the image frames captured by the pixel array 110, which are processed by the image processor 130 to detect objects in the image frames. The digital controller 140 controls various operating parameters of the imaging system 100 depending on whether an object is detected in the image frame and can also synchronize the pixel array 110, the readout circuit 120, and the image processor 130.

The pixel array 110 includes a plurality of individual photodiodes or other suitable photosensitive elements, referred to herein as "pixels" 112, arranged in a grid formation or other suitable configuration, each corresponding to a pixel of the image frames captured by the pixel array 110. Each pixel 112 is configured to detect, measure, and/or record an intensity of light rays incident upon the respective pixel 112.

Figure 3:
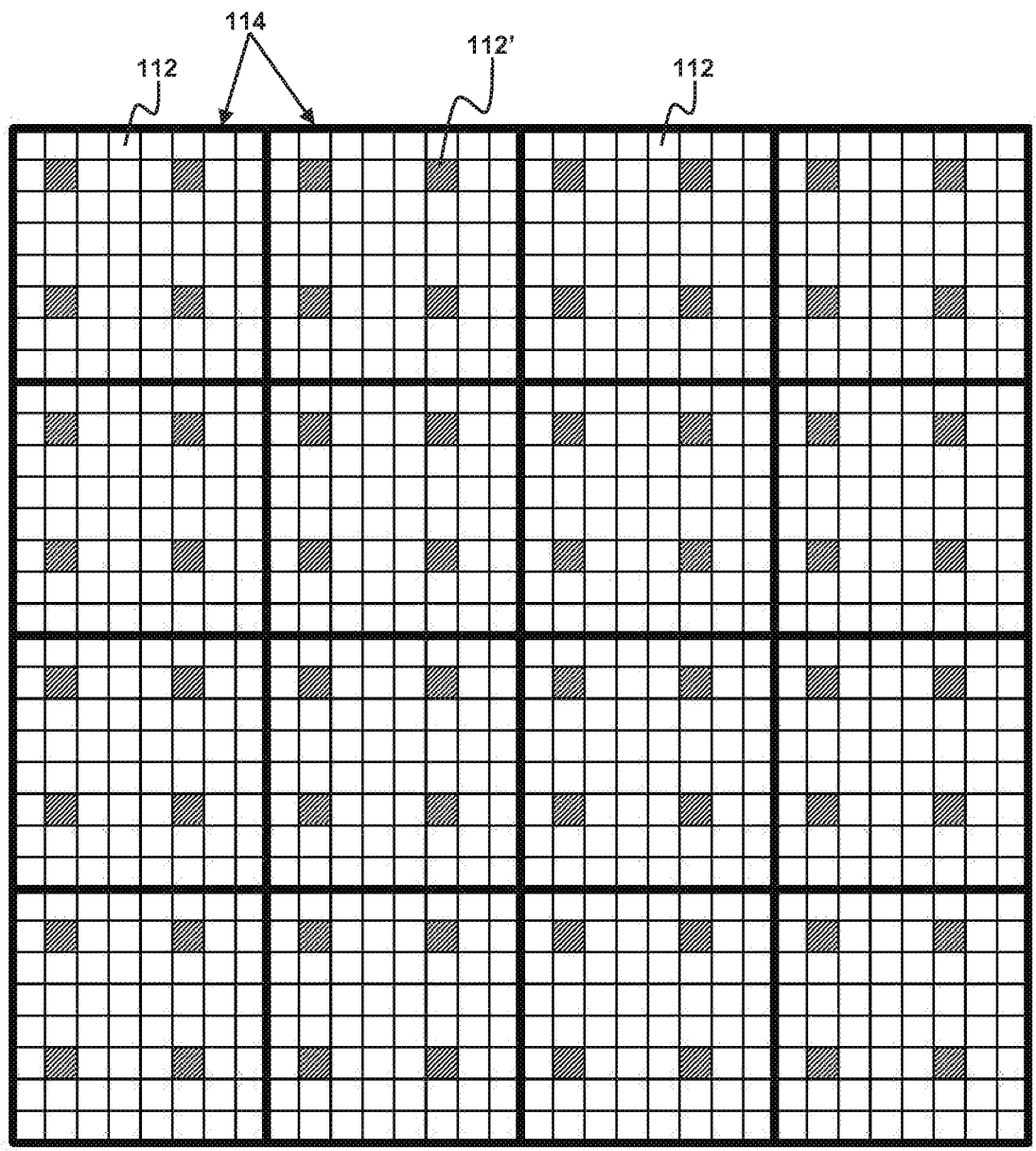
FIG. 3 shows an exemplary detailed view of the arrangement of the individual sensor elements of the pixel array.

In the illustration of FIG. 2, only a 4×4 array of individual pixels 112 is illustrated for simplicity. However, in practice, a larger array of some arbitrary size is generally used. FIG. 3 shows an exemplary detailed view of the arrangement of the individual pixels 112 of the pixel array 110. Particularly, in the illustrated embodiment, a plurality of pixels 112 is arranged in a 32×32 grid formation. The array of individual pixels 112 is divided into a 4×4 array of "super pixels" 114 (which may also be referred to herein as "tiles"), each comprising a 8×8 array of individual pixels 112. It will be appreciated that that the pixel array 110 can include any arbitrary A×B array of individual pixels 112. Similarly, the array of individual pixels 112 can be divided into an arbitrary C×D array of super pixels, each comprising an arbitrary E×F array of individual pixels 112. However, in at least on embodiment, each super pixel 114 comprises a same number and arrangement of individual pixels 112.

Figure 4A:
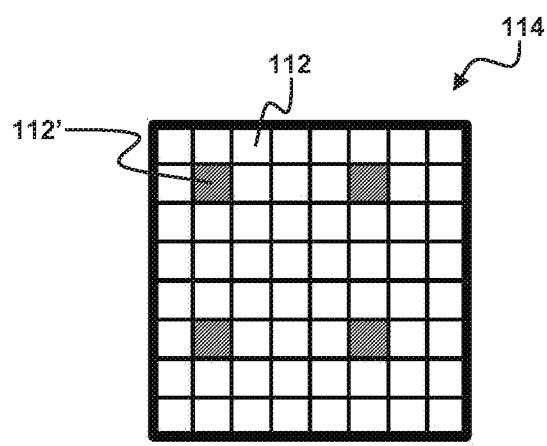
FIG. 4A shows operation of a super pixel of the pixel array in a low resolution mode.
Figure 4B:
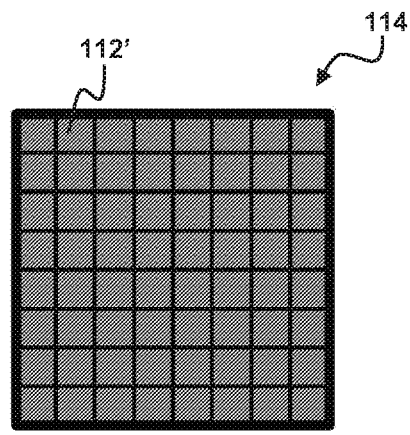
FIG. 4B shows operation of a super pixel of the pixel array in a high resolution mode.

Each super pixel 114 of the pixel array 110 is configured to operate in at least a high resolution mode and a low resolution mode. In the low resolution mode, only a subset of the individual pixels 112 of the super pixel 114 is read out. Whereas, in the high resolution mode, all of the individual pixels 112 of the super pixel 114 are read out. FIG. 4A shows operation of a super pixel 114 in the low resolution mode, in which just four of the individual pixels 112' are read out (illustrated with diagonal shading in the figures). In contrast, FIG. 4B shows operation of a super pixel 114 in the high resolution mode, in which all of the pixels 112' are read out.

Returning to FIG. 2, in one embodiment, the pixel array 110 includes a row select 116 and a column readout 118 that work in concert to read out light intensity values from individual pixels 112 in the pixel array 110. Particularly, each pixel 112 is associated with one or more transistors (not shown) configured to selectively connect the respective pixel 112 to a corresponding vertical column bus. In one embodiment, each pixel 112 is associated with four transistors in a so-called "4T pixel" configuration. The row select 116 is operably connected to the one or more transistors associated with each pixel 112 and is configured to operate the transistors to selectively connect individual pixels 112 and/or a particular horizontal row of pixels 112 to the corresponding vertical column buses. In at least some embodiments, the row select 116 is further configured to operate the one or more transistors to reset individual pixels 112 and/or the particular horizontal row of pixels 112 before connecting them to the vertical column buses, thereby defining and/or setting the integration time (which may also be referred to herein as an "exposure time"). In at least some embodiments, the row select 116 is further configured to transfer collected charge from the pixels 112 to the vertical column bus during a readout operation.

The column readout 118 is configured to read out light intensity values from the individual pixels 112 and/or a particular horizontal row of pixels 112 that are connected to the vertical column buses. Particularly, the column readout 118 is configured to provide readout voltages that are proportional to an amount of photons collected by each respective photodiode connected to a corresponding vertical column bus during the integration time and/or exposure time. The column readout 118 may comprise any suitable arrangement of amplifiers, capacitors, transistors, multiplexers, etc. to provide the readout voltages. In some embodiments, the column readout 118 includes a readout amplifier circuit (not shown) connected to each vertical column bus and configured to convert a charge build up and/or a current at the respective photodiodes into the corresponding readout voltages. In other embodiments, the one or more transistors associated with each pixel 112 are configured to perform the charge-to-voltage and/or current-to-voltage conversion and the readout voltages are provided to vertical column buses directly.

The readout circuit 120 is operably connected to the column readout 118 to receive the readout voltages corresponding to the light intensity values for the pixels 112 that are read out. The readout circuit 120 includes one or more analog-to-digital converters configured to convert the readout voltages for pixel 112 that is read out into digitized light intensity values. It will be appreciated that, in some embodiments, the analog-to-digital conversion can alternatively be performed by analog-to-digital converters integrated with the column readout 118. In this way, the readout circuit 120 can itself be a component of the pixel array 110 and integrated with the column readout 118 directly. The readout circuit 120 is configured to provide the digitized light intensity values corresponding to each captured image frame to the image processor 130.

The digital controller 140 is operably connected to the row select 116 and the column readout 118 and configured to control which pixels 112 of the pixel array 110 are read out. The digital controller 140 has at least one processor 142 operably connected to memory of the digital controller 140 which stores program instructions 144 and is configured to execute the program instructions 144 to at least enable said control of which pixels 112 of the pixel array 110 are read out. In at least one embodiment, the digital controller 140 further includes additional memory, such as SRAM (static random access memory) 146 for storing operational data. It will be recognized by those of ordinary skill in the art that a "processor" as used herein includes any hardware system, hardware mechanism or hardware component that processes data, signals, and/or other information. A processor can include a system with a central processing unit, multiple processing units, application-specific integrated circuits, programmable logic devices, dedicated circuitry for achieving functionality, and/or other systems. Likewise, the memories discussed herein may be of any type of device capable of storing information accessible by the processor, such as a memory card, ROM, RAM, hard drives, discs, flash memory, or any of various other computer-readable media serving as data storage devices as will be recognized by those of ordinary skill in the art.

The digital controller 140 is configured to operate each super pixel 114 of the pixel array 110 in either the high resolution mode or the low resolution mode, in response to commands from the image processor 130. Particularly, in response to a command from the image processor 130 for a particular super pixel 114 to be operated in the high resolution mode, the digital controller 140 is configured to control the row select 116 and the column readout 118 to update and/or sample light intensity values for every pixel 112 in the particular super pixel 114. Similarly, in response to a command from the image processor 130 for a particular super pixel 114 to be operated in the low resolution mode, the digital controller 140 is configured to control the row select 116 and the column readout 118 to update and/or sample light intensity values only for a defined subset of the pixels 112 in the particular super pixel 114.

The particular subset of pixels 112 that are updated when a particular super pixel 114 is operated in the low resolution mode is defined by an adjustable read out pattern. In the example of FIG. 4A, the particular readout pattern used in the low resolution mode includes pixels 112' at locations (2, 2), (2, 6), (6, 2), and (6, 6) within the super pixel 114. However, it will be appreciated that this readout pattern is merely exemplary and that any suitable subset of the pixels 112' may be read in the low resolution mode. In one embodiment, the processor 142 is configured to store information defining the readout pattern to be used in the low resolution mode on the SRAM 146. In at least one embodiment, the processor 142 is configured to receive commands from the image processor 130 that define the readout pattern to be used. In some embodiments, the digital controller 140 is configured to operate the super pixels 114 of the pixel array 110 in additional resolution modes, such as an intermediate resolutions mode having a readout pattern in which the subset of pixels 112' that are read out is larger than in the low resolution mode, but does not include all of the pixels 112 as in the high resolution mode.

Returning to FIG. 3, in the illustrated example, all super pixels 114 of the pixel array 110 are operated in the low resolution mode, with the same four-pixel readout pattern of FIG. 4A. Accordingly, in this example, while operating in the low resolution mode, the effective update resolution of each image frame captured by the pixel array 110 is 8×8, which is significantly reduced from the full 32×32 resolution of image frames captured by the pixel array 110 while all super pixels 114 are operating in the high resolution mode. As mentioned above, each of the super pixels 114 can be independently operated in at least the low resolution mode or the high resolution mode. As a result, the pixel array 110 may be operated, in some instances, such that only certain super pixels 114 are operated in the high resolution mode, while other super pixels are operated in the low resolution mode. As a result, the number of pixels updated in each image frame is dynamically reduced depending on which super pixels are operated in the low resolution mode or the high resolution mode.

In at least one embodiment, the readout circuit 120 is configured to sample the readout voltages corresponding to the light intensity values for each pixel 112 at an adjustable update rate and/or frame rate and to generate digitized light intensity values with an adjustable bit depth. In one embodiment, the readout circuit 120 is configured to generate the digitized light intensity values and/or image frames with a particular update rate and/or frame rate in response to a command received from the digital controller 140 and/or the image processor 130 indicating a particular update rate and/or frame rate to be used. In one embodiment, the readout circuit 120 is configured to generate the digitized light intensity values and/or image frames with a particular bit depth in response to a command received from the digital controller 140 and/or the image processor 130 indicating a particular bit depth to be used.

In at least one embodiment, the digital controller 140 receives a command from the image processor 130 indicating a reduced frame rate and/or bit depth to be for super pixels 114 operated in the low resolution mode. In one embodiment, information regarding the reduced frame rate and/or bit depth to be used in the low resolution mode is stored on the SRAM 146. If a particular super pixel 114 is to be operated in the high resolution mode, the digital controller 140 commands the readout circuit 120 to generate digitized light intensity values corresponding to pixels 112 of the particular super pixel 114 with a maximum frame rate and a maximum bit depth. In contrast, if a particular super pixel 114 is to be operated in the low resolution mode, the digital controller 140 commands the readout circuit 120 to generate digitized light intensity values corresponding to pixels 112 of the particular super pixel 114 with the reduced frame rate and/or the reduced bit depth. In this way, the amount of analog-to-digital conversion that must be performed by the readout circuit 120 is dynamically reduced depending on which super pixels 114 are operated in the low resolution mode or the high resolution mode.

The image processor 130 is configured to receive digitized light intensity values and/or image frames from the readout circuit 120. The image processor 130 has at least one processor 132 operably connected to memory of the image processor 130 which stores program instructions 134 and is configured to execute the program instructions 134 to enable one or more features of the image processor 130, at least including detecting moving objects in the received image frames. In at least one embodiment, the image processor 130 further includes additional memory, such as SRAM (static random access memory) 136 for storing operational data. It will be recognized by those of ordinary skill in the art that a "processor" as used herein includes any hardware system, hardware mechanism or hardware component that processes data, signals, and/or other information. A processor can include a system with a central processing unit, multiple processing units, application-specific integrated circuits, programmable logic devices, dedicated circuitry for achieving functionality, and/or other systems. Likewise, the memories discussed herein may be of any type of device capable of storing information accessible by the processor, such as a memory card, ROM, RAM, hard drives, discs, flash memory, or any of various other computer-readable media serving as data storage devices as will be recognized by those of ordinary skill in the art.

The program instructions 134 include instructions corresponding to a background removal module 138. Particularly, the processor 132 is configured to receive a plurality of image frames and/or digitized light intensity values thereof from the readout circuit 120. For each image frame, the processor 132 is configured to detect moving objects (e.g., the moving object 50 of FIG. 1) present in the respective image frame. Particularly, in at least one embodiment, the processor 132 is configured to detect whether a moving object is present in each individual super pixel 114 of the respective image frame. The processor 132 is configured to store, in the SRAM 136, information regarding the detected objects in the image frame and/or in each super pixel 114.

The processor 132 is configured to execute program instructions of the background removal module 138 to determine whether each super pixel 114 in the pixel array 110 should be operated in the low resolution mode or the high resolution mode. The processor 132 is configured to inform the digital controller 140 of which super pixels 114 are to be operated in the low resolution mode or the high resolution mode. In response to determining that a moving object is present in a particular super pixel 114, the processor 132 is configured to determine that the respective super pixel 114 is to be operated in the high resolution mode. Otherwise, in response to determining that no moving objects are present in a particular super pixel 114, the processor 132 is configured to determine that the respective super pixel 114 is to be operated in the low resolution mode. In this way, super pixels 114 having moving objects detected therein are operated in the high resolution mode, whereas each other super pixel is operated in the low resolution mode.

In at least one embodiment, in order to detect moving objects in a current image frame, the processor 132 is configured to compare the current image frame with a reference background image frame and/or background model that is stored in the SRAM 136. In some embodiments, the processor 132 is configured to calculate the intermediate image frame having a plurality of light intensity difference values by subtracting a reference background image frame from the current image frame. As a result, pixels of the intermediate image frame corresponding to pixels of the current image frame having light intensity values that are the same or essentially similar to that of the background image frame have very small values or zero values. However, pixels of the intermediate image frame corresponding to pixels of the current image frame having light intensity values that are different than that of the background image frame have larger non-zero values. The portions of the intermediate image frame having the larger non-zero values correspond to objects that are present in the current image frame that are not present in the background image frame. Thus, these portions of the intermediate image frame can reasonably be assumed to include a moving object, such as the moving object 50 of FIG. 1.

For each super pixel 114, if the corresponding pixels of the intermediate image frame include the larger non-zero values corresponding to moving objects, then the processor 132 is configured to determine that the respective super pixel 114 is to be operated in the high resolution mode. Otherwise, if the corresponding pixels of the intermediate frame include only the very small values or zero values corresponding to the background environment, then the processor 132 is configured to determine that the respective super pixel 114 is to be operated in the low resolution mode. In at least one embodiment, for each super pixel 114, the processor 132 is configured to determine that the respective super pixel 114 is to be operated in the high resolution mode in response to any corresponding pixel in the intermediate frame having an absolute value that exceeds a predetermined threshold difference value. Otherwise, the processor 132 is configured to determine that the respective super pixel 114 is to be operated in the low resolution mode in response to none of the corresponding pixels in the intermediate frame having an absolute value that exceeds the predetermined threshold difference value.

In at least one embodiment, the program instructions 134 include instructions corresponding to a learning module 139. Particularly, the processor 132 is configured to learn the background image frame and update it over time, as needed. In one embodiment, the background image frame may be learned initially during a setup phase and updated as needed. In one embodiment, the processor 132 is configured to update the background image frame on a super pixel basis.

In one embodiment, in response to pixels of the intermediate image frame corresponding to a respective super pixel having consistent and stable non-zero values for a predetermined number of image frames and/or for a predetermined duration of time, the processor 132 is configured to update that super pixel of the background image frame with the current values of the current image frame. This may occur, for example, if one of the background objects 40 (e.g., a chair) is moved to a slightly different location of the scene 20 and left at the new location semi-permanently. When a particular super pixel 114 is updated, the super pixel 114 is operated for at least one frame in the high resolution mode and the background image frame is updated in high resolution. After updating the background image frame, the processor 132 is configured to store the updated background image frame in the SRAM 136. In some embodiments, the processor 132 executes instructions of the learning module 139 to determine an identity or type of the moving objects and store information regarding the identity or type in the SRAM 136.

In some embodiments, the processor 132 is configured to execute instructions of the background removal module 138 and/or learning module 139 to minimize a need to update the background image frame and/or background model due to changes in lighting conditions. Particularly, significant changes in lighting conditions in the scene 20 will generally trigger an updating of the background image frame due to significant changes in the light intensity values in the received image frames. The digital controller 140 is configured to command the pixel array 110 to operate with an adjustable integration time or exposure time. In at least one embodiment, the processor 132 is configured command the digital controller 140 to adjust the integration time or exposure time in response to detecting a lighting change in the current image frame. Particularly, if the scene 20 becomes brighter, then the processor 132 is configured to command the digital controller 140 to reduce the integration time or exposure time. In contrast, if the scene 20 becomes darker, then the processor 132 is configured to command the digital controller 140 to increase the integration time or exposure time. It at least one embodiment, the processor 132 is configured to detect a lighting change in response to all or a predetermined percentage of the pixels of the current image frame being different from the background image frame by roughly a same percentage. In this way, the changes in lighting conditions can be compensated for without needing to update the background image frame. The adjustment of integration time or exposure time will generally result in less frequent updates to the background image frame and additional power savings.

The above description describes various features of the image processor 130 and digital controller 140. It will be appreciated that, in some embodiments, the functions described with respect to the processor 132 and 142 of the image processor 130 and digital controller 140 and/or the program instructions 134 and 144 of the image processor 130 and digital controller 140 may be performed by a single processing device. Similarly, in some embodiments, features described with respect to the processor 132 and/or the program instructions 134 of the image processor 130 may be performed by the processor 142 and/or the program instructions 144 of the digital controller 140. Likewise, in some embodiments, features described with respect to the processor 142 and/or the program instructions 144 of the digital controller 140 may be performed by the processor 132 and/or the program instructions 134 of the image processor 130.

The digital controller 140 and image processor 130, and the program instructions associated therewith, the improve upon conventional controllers for pixels arrays because they enable dynamic adjustment of the resolution, the update/refresh rate, and bit depth of individual each super pixel 114 depending on a moving object is present in the respective super pixels 114. By doing this, much less data is read out, converted, and processed, thereby reducing the power consumption of the imaging 100. However, because there are still selected pixels read out in the low resolution mode, the processor 132 is still able to detect if a moving object appears in the super pixels 114 operated in the low resolution mode. Thus, energy savings are achieved without the loss of important information.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable program instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods and features disclosed herein. The particular sequence of such executable instructions or associated data structures represents examples of corresponding acts for implementing the functions described in such steps.

What is claimed is:

1. An imaging system comprising:
    a pixel array having a plurality of photosensitive elements arranged in a grid formation and being divided into a plurality of groups of photosensitive elements, the photosensitive elements in each group of photosensitive elements being adjacent to one another in the grid formation, the pixel array being configured to output readout voltages proportional to light intensities at individual photosensitive elements in the plurality of photosensitive elements;
    an analog-to-digital converter operably connected to the pixel array to receive the readout voltages and convert the readout voltages into digitized light intensity values; and
    at least one processor operably connected to the pixel array and the analog-to-digital converter, the at least one processor being configured to selectively operate each group of photosensitive elements in the plurality of groups of photosensitive elements in one of (i) a high resolution mode in which the pixel array outputs readout voltages corresponding to all of the photosensitive elements in the respective group of photosensitive elements and (ii) a low resolution mode in which the pixel array outputs readout voltages corresponding to only a subset of the photosensitive elements in the respective group of photosensitive elements,
    wherein each group of photosensitive elements in the plurality of groups of photosensitive elements is operable by the at least one processor in both the high resolution mode and the low resolution mode at different times
    wherein the at least one processor is configured to:
        for each group of photosensitive elements in the plurality of groups of photosensitive elements that is operated in the low resolution mode, control the analog-to-digital converter to convert the readout voltages corresponding to the respective the subset of the photosensitive elements in the respective group of photosensitive elements with a first bit depth that is less than a maximum bit depth of the analog-to-digital converter; and
        for each group of photosensitive elements in the plurality of groups of photosensitive elements that is operated in the high resolution mode, control the analog-to-digital converter to convert the readout voltages corresponding to all of the photosensitive elements in the respective group of photosensitive elements with the maximum bit depth of the analog-to-digital converter.

2. The imaging system of claim 1, the at least one processor being configured to:
    receive an image frame, from the analog-to-digital converter, comprising digitized light intensity values corresponding to at least some of the photosensitive elements in each group of photosensitive elements in the plurality of groups of photosensitive elements; and
    selectively operate each group of photosensitive elements in the plurality of groups of photosensitive elements in the high resolution mode and the low resolution mode at different times depending on the digitized light intensity values of the image frame.

3. The imaging system of claim 2, the at least one processor being configured to:
    operate a first group of photosensitive elements in the plurality of groups of photosensitive elements in the low resolution mode depending on to the digitized light intensity values in the image frame corresponding to the photosensitive elements in the first group of photosensitive elements; and
    operate a second group of photosensitive elements in the plurality of groups of photosensitive elements in the high resolution mode depending on to the digitized light intensity values in the image frame corresponding to the photosensitive elements in the second group of photosensitive elements.

4. The imaging system of claim 2, the at least one processor being configured to, for each group of photosensitive elements in the plurality of groups of photosensitive elements:
   detect whether any moving objects are present in a respective portion of the image frame corresponding to the respective group of photosensitive elements based on the digitized light intensity values in the image frame corresponding to the photosensitive elements in the respective group of photosensitive elements;
   operate the respective group of photosensitive elements in the low resolution mode in response to no moving object being detected in the respective portion of the image frame corresponding to the respective group of photosensitive elements; and
   operate the respective group of photosensitive elements in the high resolution mode in response to a moving object being detected in the respective portion of the image frame corresponding to the respective group of photosensitive elements.

5. The imaging system of claim 4, the at least one processor being configured to, for each group of photosensitive elements in the plurality of groups of photosensitive elements:
   compare the respective portion of the image frame corresponding to the respective group of photosensitive elements with a corresponding portion of a reference background image frame to detect whether any moving objects are present in the respective portion of the image frame.

6. The imaging system of claim 5, the at least one processor being configured to:
   generate an intermediate image frame comprising light intensity difference values by subtracting the reference background image frame from the received image frame.

7. The imaging system of claim 6, the at least one processor being configured to, for each group of photosensitive elements in the plurality of groups of photosensitive elements:
   operate the respective group of photosensitive elements in the low resolution mode in response to the absolute value of each light intensity difference value of a respective portion of the intermediate image frame that corresponds to the respective group of photosensitive elements being less than a predetermined threshold difference value; and
   operate the respective group of photosensitive elements in the high resolution mode in response to the absolute value of any light intensity difference value of a respective portion of the intermediate image frame that corresponds to the respective group of photosensitive elements being greater than a predetermined threshold difference value.

8. The imaging system of claim 5, the at least one processor being configured to:
   detect a change of lighting conditions in the image frame based on the digitized light intensity values of the image frame; and
   operate the pixel array with an adjusted exposure time that depends on the change in the lighting conditions.

9. The imaging system of claim 6, the at least one processor being configured to:
   identify at least one portion of the reference background image frame to be updated based on the intermediate image frame, the at least one portion corresponding to at least one group of photosensitive elements in the plurality of groups of photosensitive elements; and
   update the at least one portion of the reference background image frame based on at least one corresponding portion of the image frame.

10. The imaging system of claim 1, wherein:
    each group of photosensitive elements in the plurality of groups of photosensitive elements comprises a common number of photosensitive elements arranged in a common formation within the grid formation; and
    for each group of photosensitive elements in the plurality of groups of photosensitive elements that is operated in the low resolution mode, the subset of the photosensitive elements for which the pixel array outputs readout voltages corresponds to a defined pattern of photosensitive elements within the common formation.

11. The imaging system of claim 10, wherein the defined pattern of photosensitive elements within the common formation is adjustable by the at least one processor.

12. The imaging system of claim 1, wherein the first bit depth is adjustable by the at least one processor.

13. The image system of claim 1, the at least one processor being configured to:
    for each group of photosensitive elements in the plurality of groups of photosensitive elements that is operated in the low resolution mode, control the pixel array and the analog-to-digital converter to update and convert the readout voltages corresponding to the subset of the photosensitive elements in the respective group of photosensitive elements with a first update rate that is less than a maximum update rate; and
    for each group of photosensitive elements in the plurality of groups of photosensitive elements that is operated in the high resolution mode, control the pixel array and the analog-to-digital converter to update and convert the readout voltages corresponding to all of the photosensitive elements in the respective group of photosensitive elements with the maximum update rate.

14. The imaging system of claim 13, wherein the first update rate is adjustable by the at least one processor.

15. An imaging system comprising:
    a pixel array having a plurality of photosensitive elements arranged in a grid formation and being divided into a plurality of groups of photosensitive elements, the photosensitive elements in each group of photosensitive elements being adjacent to one another in the grid formation, the pixel array being configured to output readout voltages proportional to light intensities at individual photosensitive elements in the plurality of photosensitive elements;
    an analog-to-digital converter operably connected to the pixel array to receive the readout voltages and convert the readout voltages into digitized light intensity values; and
    at least one processor operably connected to the pixel array and the analog-to-digital converter, the at least one processor being configured to selectively operate each group of photosensitive elements in the plurality of groups of photosensitive elements in one of (i) a high resolution mode in which the pixel array outputs readout voltages corresponding to all of the photosensitive elements in the respective group of photosensitive elements and (ii) a low resolution mode in which the pixel array outputs readout voltages corresponding to only a subset of the photosensitive elements in the respective group of photosensitive elements, wherein each group of photosensitive elements in the plurality of groups of photosensitive elements is operable by the at least one processor in both the high resolution mode and the low resolution mode at different times, and wherein the at least one processor is further configured to:
for each group of photosensitive elements in the plurality of groups of photosensitive elements that is operated in the low resolution mode, control the pixel array and the analog-to-digital converter to update and convert the readout voltages corresponding to the subset of the photosensitive elements in the respective group of photosensitive elements with a first update rate that is less than a maximum update rate; and for each group of photosensitive elements in the plurality of groups of photosensitive elements that is operated in the high resolution mode, control the pixel array and the analog-to-digital converter to update and convert the readout voltages corresponding to all of the photosensitive elements in the respective group of photosensitive elements with the maximum update rate.

* * * * *